(12) United States Patent
Gines et al.

(10) Patent No.: US 6,602,102 B2
(45) Date of Patent: Aug. 5, 2003

(54) BUOYANT SILICONE RUBBER COMPOUND

(75) Inventors: Brent Gines, Sandy, UT (US); Rique Ford, Brea, CA (US)

(73) Assignee: South Valley Specialties, Sandy, UT (US)

( * ) Notice: Subject to any disclaimer, the term of this patent is extended or adjusted under 35 U.S.C. 154(b) by 0 days.

(21) Appl. No.: 09/974,509

(22) Filed: Oct. 10, 2001

(65) Prior Publication Data

US 2003/0068505 A1 Apr. 10, 2003

(51) Int. Cl.[7] .................. A63B 31/08; B63C 11/12; A61F 9/02; C08G 77/08; C08J 3/00
(52) U.S. Cl. .............. 441/64; 441/124; 2/2.15; 2/15; 2/426; 428/332; 524/858; 524/860; 523/333; 528/15; 528/33
(58) Field of Search .................... 428/446, 447, 428/332; 528/10, 14, 15, 33; 523/333; 524/858, 860; 441/64, 124; 2/2.15, 15, 426

(56) References Cited

U.S. PATENT DOCUMENTS

| 4,060,435 | A | * | 11/1977 | Schroeder | 149/19.2 |
|---|---|---|---|---|---|
| 5,202,362 | A | * | 4/1993 | Hermele | 523/218 |
| 5,609,164 | A | | 3/1997 | Dyrud et al. | |
| 5,727,566 | A | | 3/1998 | Leight | |
| 5,904,143 | A | | 5/1999 | Magidson et al. | |
| 6,127,457 | A | * | 10/2000 | Darling | 523/218 |
| 6,194,476 | B1 | | 2/2001 | De Ridder et al. | |
| 6,218,461 | B1 | | 4/2001 | Schwabe et al. | |
| 6,281,285 | B1 | | 8/2001 | Becker et al. | |
| 6,294,636 | B1 | | 9/2001 | Baba et al. | |
| 6,297,305 | B1 | | 10/2001 | Nakata et al. | |

* cited by examiner

*Primary Examiner*—Robert Dawson
*Assistant Examiner*—Michael J Feely
(74) *Attorney, Agent, or Firm*—John Mugno; Richard L. Strauss

(57) ABSTRACT

A buoyant silicone rubber compound—and process for preparing same—is disclosed wherein hollow micro spheres are incorporated into the formulation in order to decrease the specific gravity of the compound to less than 1.0. The disclosed compound is prepared by admixing from about 85 to 99 weight percent polydimethyl siloxane with from about 1 to 15 weight percent hollow micro spheres. The micro spheres are selected to have a mean particle diameter of from about 10 to 500 microns. Aquatic gear comprised of the afore-mentioned buoyant silicone rubber exhibiting positive buoyancy/flotation such as ear plugs, swim goggles, dive masks, fins and sun glasses are also disclosed.

32 Claims, No Drawings

BUOYANT SILICONE RUBBER COMPOUND

TECHNICAL FIELD

The present invention relates to silicone rubber materials. More specifically, the present invention relates to the field of silicone rubber materials especially formulated and adapted for use in products exposed to and utilized in an aquatic environment.

BACKGROUND OF THE ART

Silicone rubber has long been the material of choice for applications requiring a composition easily formed into and able to maintain a determined, yet pliable shape. It is also the material of choice where resistance to degradation due to environmental factors such as, for example, temperature extremes, acids, bases, salts, ultraviolet light and chlorine is desired. Carbon based polymers may demonstrate favorable pliability. However, unlike silicone based rubbers, carbon polymers may be severely degraded by the afore-mentioned environmental factors and thereby quickly lose their elastometric properties (as well as the adaptive-fit quality provided thereby). Therefore, in applications where superior pliability and adaptability are required of articles exposed to harsh environmental factors, such as, for example, ear plugs, swim goggles and dive masks, carbon based polymers simply do not excel. These materials are easily degraded by environmental factors and thereafter become rigid, losing their adaptive fit qualities. As a result of the loss of such pliability, degraded carbon polymer aquatic gear can chafe and irritate the skin which they contact while, at the same time, failing to provide the water tight seal they were originally designed to provide.

The superior pliability of silicone rubber allows this polymer to be formed into virtually any shape, and thereafter adapt its form so as to precisely mate with irregular surfaces in order to provide a water tight seal. Although colorless, silicone rubber products can be pigmented to any color desired, including fluorescent colors. In addition, silicone rubber has been found to be a very well tolerated hypoallergenic material for applications involving prolonged contact with skin surfaces. Therefore, silicone rubber is an ideal material for personal swimming and diving apparel wherein a precise water tight fit is required to be maintained in an otherwise harsh environment. For all of the foregoing reasons, silicone material is especially suited for SCUBA and snorkeling masks, flippers, swim goggles, swim fins and mouth pieces utilized in scuba second stage regulators. This material is also extremely well suited for the fabrication of ear plugs worn in aquatic environments. Silicone rubber may be polymerized via a platinum catalyst. Unlike other catalysts, such as peroxides which may remain within the material and thereafter leach out upon and irritate the skin of a user, silicone rubber polymerized with platinum does not contain any excess peroxides. Also, for obvious environmental reasons, elimination of peroxide catalysts is a sound environmental alternative. The typical silicone rubber utilized in the manufacture of ear plugs is a low durometer, low modulus, high strength platinum catalyzed material.

Although silicone rubber has been successfully utilized for many decades in the afore-mentioned aquatic applications, the material has demonstrated one apparent short coming. All of the above mentioned personal water apparel and gear may, on occasion, be unintentionally lost while being worn. More particularly, the specific gravity of silicone rubber is used for the above-described gear is at least about 1.07, well above that of the specific gravity of water. Therefore, silicone rubber does not demonstrate sufficient buoyancy so as to prevent the fin, mask, goggle, ear plug, or other such silicone gear from sinking below the water's surface if it should become detached from the wearer. Once below the surface, the negative buoyancy of the gear will cause it to sink out of reach and often become permanently lost. Even if the gear is lost in a clear pool, diving underwater, without utilizing the lost earplug, mask or goggle designed to seal water away from sensitive ear canals or the eye, defeats the purpose of utilizing the gear in the first place.

It would therefore be highly advantageous if a silicone rubber material could be formulated, demonstrating all of the above-described desirable properties while, at the same time, demonstrating a specific gravity sufficiently less than water so as to enable the subject article to float. It would be further advantageous to fabricate personal gear and apparel, such as flippers, masks, snorkels, goggles, eye cases, eye glass holders and ear plugs, of a sufficient amount of said buoyant silicone rubber, so as to prevent such objects from sinking below the surface in an aquatic environment.

SUMMARY OF THE INVENTION

Now in accordance with the present invention, a buoyant silicone rubber composition—and a process for preparing same is disclosed—. The buoyant silicone rubber of the present invention demonstrates a specific gravity less than that of water and attains such through the incorporation of hollow micro spheres within the composition. Therefore, the present invention advantageously selects hollow micro spheres demonstrating a specific gravity substantially less than that of water (1) and far less than the below-described polydimethyl siloxane in order to form a silicone product with an overall specific gravity less than 1.

The present invention discloses, not only the above-described buoyant silicone compound and process for preparing same, but also discloses personal aquatic gear advantageously incorporating this floatable material. For example, the buoyant silicone rubber of the present invention is especially suited for the manufacture of personal aquatic gear such as earplugs, eyeglass frames—including sun glass frames—, swim goggles, diving masks, and snorkels commonly utilized in and about an aquatic environment. Since the process and compound of the present invention enable such articles made thereby and thereof to float, the utility of all such articles in an aquatic environment—and the safety against loss of such articles enabled thereby—is greatly enhanced.

As discussed in greater detail below, the compound and process of the present invention also contemplates the incorporation of plasticizing agents within the silicone rubber compound so as to increase pliability of articles comprised thereof. Plasticizing agents are especially useful for incorporation into the present compound in applications wherein the buoyant silicone rubber will be utilized for articles and devices wherein pliability is of great value. For example, earplugs, dive masks, swim goggles, and the mouth pieces of diving/snorkel equipment require high pliability so as to perfectly adapt and achieve a water-tight seal about the eyes, nose, mouth and ears of individuals using same. In addition, the present invention also contemplates incorporation of pigments as coloring agents when such is desired for esthetic reasons.

DETAILED DESCRIPTION

The process of the present invention is comprised of admixing polydimethyl siloxane with the afore-mentioned hollow micro spheres at a rate so as to assure complete and uniform dispersion of the micro spheres within the uncured silicone polymer. Thereafter, upon curing, the low density micro spheres, incorporated uniformly within the silicone polymer, yields a sufficient enough decrease in overall composition density so as to provide buoyancy.

The silicone rubber of the present invention is advantageously comprised of from about 85–99% by weight polydimethyl siloxane and from about 1–15% by weight hollow micro spheres. Polydimethyl siloxane may be purchased from any commercial supplier such as, for example, Wacker Silicones Corporation, 3301 Sutton Road, Adrian, Mich. 49221. Hollow micro spheres suitable for use in practicing the present invention may be comprised of a polyacrylonitrile, or a polymethacrylonitrile. It is preferred that the micro spheres are selected to demonstrate a mean particle diameter of from 10–500 microns so as to assure a uniform and consistent integration. Suitable micro spheres may be purchased from PQ Corporation, Valley Forge, Pa., PM 6545 or any other commercial supplier of hollow micro spheres. When, as described below, the silicone rubber composition incorporates a plasticizing agent and/or pigment(s), it is preferred that the compound be comprised of from about 85 to 99 weight percent polydimethyl siloxane, from about 1 to 15 weight percent hollow micro spheres, from about 1 to 5 weight percent plasticizing agent and from about 1 to 5 weight percent pigment.

The buoyant silicone rubber of the present invention is prepared by gradually admixing a selected percentage weight of microspheres to a pre-determined weight quantity of polydimethyl siloxane utilizing a blade mixer such as, for example, a 5 gallon sigma blade mixer manufactured by a 5 gallon sigma blade mixer manufactured by Baker Perkins. The microspheres must be added to the mixer at a very slow rate so as to assure uniform and full dispersed mixture. Thus it is preferred that the mixer be set to a maximum speed of from about 10 to 14 RPM.

Desired pigments, of any selected color, such as those manufactured by Grayson Specialty Dispersions Inc., Barberton, Ohio, may be advantageously incorporated into the mixture. In addition, plasticity enhancement additives such as HA-2, manufactured by Dow Corning Corporation may be advantageously incorporated therein. The constituent materials are blended until all components are uniformly dispersed. Thereafter, the mixture may be injected into molds configured in accordance with the desired shape of the articles and devices described above and thereafter cured via a catalyst. It is preferred that crosslinking be attained through a platinum catalyzed hydrosilation reaction so as to avoid the presence of free catalyst in the final product.

It is an object of the present invention that articles such as, for example, ear plugs, goggles, masks and fins produced in accordance with the methods and compositions disclosed herein exhibit positive buoyancy. Thus, the specific gravity of the hollow micro spheres utilized in practicing the present invention must be selected to be less than 1. It is preferred to select microspheres demonstrating a specific gravity of from about 0.001 grams per cubic centimeter to about 0.100 grams per cubic centimeter. By varying either the weight percentage or specific gravity of microspheres added to the polydimethyl siloxane rubber those skilled in the art may adjust the overall specific gravity and thus buoyancy of the resultant material. Thus the degree of buoyancy of the final product may be controlled. For articles made entirely of silicone rubber such as, for example, ear plugs, only a minimum amount of microspheres, within the above-described weight range percentages is required—in that no other material exhibiting negative buoyancy is attached thereto requiring flotation—. However, gear such as, for example, diving masks and eyeglass frames, which may incorporate other materials having negative buoyancy, will require an increased weight percentage of micro sphere, within the above-described weight range of 1–15%, in order to provide overall buoyancy to the entire object. In addition, gear incorporating materials exhibiting such negative buoyancy, may be selected to incorporate micro spheres demonstrating the lowest specific gravity within the above-described range so as to further reduce the specific gravity of the overall product.

EXAMPLE I

Polydimethyl siloxane (part number PS48307) exhibiting a specific gravity of 1.09 was obtained from Precision Silicones Inc., Chino, Calif. Polyacrylonitrile micro spheres manufactured by PQ Corporation, Valley Forge, Pa., demonstrating a specific gravity of 0.009 were also obtained. In addition a proprietary plasiticity enhancer, HA-2 manufactured by Dow Corning Corporation, Midland, Mich., was procured. A mixture comprised of 86 weight percent of said polydimethyl siloxane, 10 weight percent of said plyacrylonitrile micro spheres and 4% of said HA-2 was prepared by means of admixing the constituents with a sigma blade mixer. The mixer was operated at 12 RPMs to allow for adequate dispersion of the micro spheres. The micro spheres were added at the rate of 100 grams every 5 minutes, resulting in a total mix time of 90 minutes for the 40 pound batch of material. The mixing temperature was maintained at approximately 70 degrees. Thereafter the mixture was cured utilizing a platinum catalyzed hydrosilation reaction. The fully crosslinked product demonstrated a resultant specific gravity is 0.0838.

EXAMPLE II

Polydimethyl siloxane (part number PS48307) exhibiting a specific gravity of 1.09 was obtained from Precision Silicones Inc., Chino, Calif. Polyacrylonitrile micro spheres manufactured by PQ Corporation, Valley Forge, Pa., demonstrating a specific gravity of 0.009 were also obtained. In addition a proprietary plasiticity enhancer, HA-2 manufactured by Dow corning Corporation, Midland, Mich., was procured. A mixture comprised of 95 weight percent of said polydimethyl siloxane, 2.5 weight percent of said plyacrylonitrile micro spheres and 2.5% of said HA-2 was prepared by means of admixing the constituents with a sigma blade mixer. The mixer was operated at 12 RPMs to allow for adequate dispersion of the micro spheres. The micro spheres were added at the rate of 100 grams every 5 minutes, resulting in a total mix time of 90 minutes for the 40 pound batch of material. The mixing temperature was maintained at approximately 70 degrees. Thereafter the mixture was cured utilizing a platinum catalyzed hydrosilation reaction. The fully crosslinked product demonstrated a resultant specific gravity of 0.237.

Thus, as demonstrated by the above described examples, an increase in the weight percentage of micro spheres incorporated into the mixture effects substantial changes in the specific gravity of the final, fully cured product. In "Example I", incorporation of 10% micro spheres (demonstrating a specific gravity of 0.009) resulted in a final cured silicone rubber composition attaining a specific gravity of 0.0838. By decreasing the weight percentage of said micro spheres to 2.5% (in "Example II), the resultant cured rubber demonstrated a specific gravity of 0.237 —three times greater than the product of "Example I". Thus substantial control may be obtained as to the specific gravity of the silicone rubber composition of the present invention through simple manipulation of the weight percentage of micro spheres incorporated therein.

The terms and expressions which have been employed in the foregoing specification are used therein as terms of description and not limitation, and there is no intention, in the use of such terms and expressions, of excluding equivalents of the features shown and described or portions thereof, it being recognized that the scope of the invention is defined and limited only by the following claims

We claim:

1. A process for preparing a buoyant silicone rubber comprised of admixing from about 85 to about 99 weight percent polydimethyl siloxane and a selected weight percentage of hollow micro spheres at a rate selected so as to assure uniform mixture thereof; and curing said mixture by means of a catalyst so as to form a fully crosslinked silicone rubber composition demonstrating a specific gravity less than that of water.

2. The process of claim 1 wherein the weight percentage of micro spheres is selected to be from about 1 to 15 weight percent.

3. The process of claim 1 wherein the micro spheres are comprised of an acrylic.

4. The process of claim 3 wherein said micro spheres are comprised of a polyacrylonitrile or a polymethacrylonitrile acrylic.

5. The process of claim 1 wherein said silicone rubber is cured by means of a platinum catalyzed hydrosilation reaction.

6. The process of claim 1 wherein the polydimethyl siloxane and the hollow micro spheres are admixed by means of a sigma blade mixer.

7. The process of claim 6 wherein the polydimethly siloxane and the hollow micro spheres are admixed at a rate of from about 10 to 14 RPM.

8. The process of claim 1 wherein the hollow micro spheres are selected to have a mean particle diameter of from 10–500 $\mu$m.

9. The process of claim 1 wherein a plasticizing agent is added to said admixture.

10. The process of claim 9 wherein said admixture is comprised of from about 85 to 99 weight percent polydimethly siloxane, from about 1 to 15 weight percent hollow micro spheres and from about 1 to 5 percent plasticizing agent.

11. The process of claim 1 wherein a pigment is added to said admixture.

12. A buoyant silicone rubber composition comprised of from about 85 to about 99 weight percent polydimethyl siloxane; from about 1 to about 15 weight percent hollow micro spheres; and from about 1 to about 5 weight percent plasticizing agent wherein said composition demonstrates a specific gravity less than that of water.

13. The composition of claim 12 wherein the micro spheres are comprised of an acrylic polymer.

14. The composition of claim 13 wherein said micro spheres are comprised of a polyacrylonitrile or a polymethacrylonitrile acrylic.

15. The composition of claim 12 wherein the hollow micro spheres demonstrate a mean particle diameter of from 10–500 $\mu$m.

16. The composition of claim 12 wherein a pigment is added to said admixture.

17. A buoyant article of aquatic gear comprised of from about 85 to about 99 weight percent polydimethyl siloxane; from about 1 to about 15 weight percent hollow microspheres; and from about 1 to about 5 weight percent plasticizing agent wherein said article of aquatic gear demonstrates a specific gravity less than that of water.

18. The aquatic gear of claim 17 wherein the micro spheres are comprised of an acrylic polymer.

19. The aquatic gear of claim 17 wherein said micro spheres are comprised of a polyacrylonitrile or a polymethacrylonitrile acrylic.

20. The aquatic gear of claim 17 wherein the hollow micro spheres demonstrate a mean particle diameter of from 10–500 $\mu$m.

21. The aquatic gear of claim 17 wherein a pigment is added to said admixture.

22. The aquatic gear of claim 17 wherein said gear is an earplug.

23. The aquatic gear of claim 17 wherein said gear is selected from the group consisting of dive masks, swim goggles, fins, and eyeglass frames.

24. A process of preparing a buoyant silicone rubber composition comprised of admixing from about 85 to about 99 weight percent of polydimethyl siloxane; from about 1 to about 15 weight percent hollow micro spheres; and from about 1 to about 5 weight percent plasticizing agent at a rate selected so as to assure uniform mixture thereof wherein said composition demonstrates a specific gravity less than that of water.

25. The process of claim 24 wherein the micro spheres are comprised of an acrylic polymer.

26. The process of claim 25 wherein said micro spheres are comprised of a polyacrylonitrile or a polymethacrylonitrile acrylic.

27. The process of claim 24 wherein the polydimethyl siloxane, hollow micro spheres and plasticizing agent are admixed by means of a sigma blade mixer.

28. The process of claim 27 wherein the polydimethyl siloxane, hollow micro spheres, and plasticizing are admixed at a rate of from about 10 to 14 RPM.

29. The process of claim 24 further comprising curing said admixture by means of a catalyst so as to form a fully crosslinked silicone rubber.

30. The process of claim 29 wherein said silicone rubber is cured by means of a platinum catalyzed hydrosilation reaction.

31. The process of claim 24 wherein the hollow micro spheres demonstrate a mean particle diameter of from 10–500 $\mu$m.

32. The process of claim 24 wherein a pigment is added to said admixture.

* * * * *